United States Patent [19]

Wastl, Sr.

[11] Patent Number: 4,630,485

[45] Date of Patent: Dec. 23, 1986

[54] GAS OR LOW VOLUME LIQUID FLOW METER

[75] Inventor: Max Wastl, Sr., Lafayette, Ind.

[73] Assignee: Lafayette Instrument Co., Inc., Lafayette, Ind.

[21] Appl. No.: 677,543

[22] Filed: Dec. 3, 1984

[51] Int. Cl.$^4$ .............................................. G01F 1/24
[52] U.S. Cl. .................. 73/861.56; 73/861.57
[58] Field of Search .......... 73/861.54, 861.55, 861.56, 73/861.57; 250/211 K, 231 R, 231 P; 338/15

[56] References Cited

U.S. PATENT DOCUMENTS

| | | | |
|---|---|---|---|
| 2,091,792 | 8/1937 | Niesemann | 73/861.54 |
| 2,404,361 | 7/1946 | Brewer | 73/861.57 X |
| 3,308,303 | 3/1967 | Weichselbaum et al. | 250/231 P |
| 3,582,662 | 6/1971 | Soiita | 73/861.56 X |
| 4,257,279 | 3/1981 | Marx | 73/861.57 |
| 4,315,436 | 2/1982 | McCabe | 73/861.54 |
| 4,335,618 | 6/1982 | Bocsky et al. | 73/861.56 |
| 4,486,744 | 12/1984 | Pratt et al. | 73/861.56 X |

FOREIGN PATENT DOCUMENTS 2111196  9/1981  United Kingdom ................ 338/15

*Primary Examiner*—Herbert Goldstein
*Attorney, Agent, or Firm*—Woodard, Weikart, Emhardt & Naughton

[57] ABSTRACT

An apparatus permitting non-invasive electrical monitoring of the volume of flow of a fluid at relatively low pressures and flow rates. The apparatus comprises an analog flow gage having a housing with an inner flow chamber of upwardly increasing cross sectional area and a ball indicator received in the chamber. The flow chamber is in the shape of a cylinder with a plurality of longitudinal slits extending outwardly from the cylinder and equally radially spaced apart. Each of the slits has a wedge shaped tapered portion which accounts for the increasing cross sectional area of the chamber. The flow rate inside the chamber is directly linearly related to the amount of upward displacement of the ball indicator along the length of the tapered portions. The apparatus also includes associated electrical circuitry for providing infinite step position detection of the ball indicator, converting the analog position information into a digital output and displaying a digital readout of the accumulative volume of flow, scaled in cubic feet.

9 Claims, 5 Drawing Figures

GAS OR LOW VOLUME LIQUID FLOW METER

BACKGROUND OF THE INVENTION

The present invention relates generally to the field of gas or liquid flow measurement devices used and, more particularly, to such devices which are especially useful for metering the volume of oxygen delivered to a patient from oxygen delivering equipment.

In certain medical situations it is desirable to deliver relatively high concentrations (approximately 98%) of oxygen to a patient. The period and course of administration of oxygen differs widely depending upon the precise situation, but can occur over extended periods of time, or over permanently. For medical reasons, it may be of interest to monitor the amount of oxygen which is delivered to the patient per unit time, such as minutes. For purposes of charging the patient for the use of the equipment, it is useful to meter the accumulative amount of oxygen delivered to the patient.

Due to the relatively low pressures and flow rates encountered in such situations (ranging usually from 1-10 p.s.i. and from 0.5-10 liters/min.), it is important for purposes of measurement accuracy to minimize any interruption of flow caused by the measuring device. Also, due to the fact that oxygen is highly explosive, the means by which measurement of flow volume is accomplished must be restricted to one which will not present a significant risk from this hazard.

SUMMARY OF THE INVENTION

An apparatus for measuring the accumulative volume of flow of a fluid at relatively low pressures and flow rates. The apparatus comprises an analog flow meter including a housing having upper and lower portions. The housing has a hollow interior defining a generally cylindrically shaped chamber, the upper and lower portions of said housing respectively having output and input flow passages in flow communication with said chamber. The housing further defines a plurality of slits extending longitudinally within and further defining said chamber. Each of the slits have along at least a portion of their lengths a taper extending outwardly towards the upper portion of the housing whereby the cross-sectional area of the chamber increases upwardly along the length of the tapered portions of the slits. The apparatus is further comprised of a sphericallly shaped float indicator which is movable vertically within the chamber. When the indicator is positioned along the tapered portions of the slits, the flow rate of the fluid flowing through the chamber is directly linearly related to the upward displacement of the indicator. A position detection means is also provided, non-invasively mounted to the analog flow meter, for detecting the vertical position of the indicator and providing an electrical output signal which is responsive thereto. There is further provided a conversion means for converting the output from the position detection means into an electrical output representative of the accumulative fluid flow through the analog flow meter.

Accordingly, it is an object of the present invention to provide an improved apparatus for metering the volume of flow of a fluid.

Another object of the present invention is to provide an apparatus for metering the volume of flow of a fluid which is highly accurate in a relatively low flow and low pressure environment.

It is a further object of the present invention to provide an apparatus which is particularly useful for metering the volume of oxygen delivered to a patient, and which avoids the possibility of igniting the oxygen being measured.

A yet further object of the present invention is to provide an apparatus for metering the volume of oxygen delivered to a patient and which has a detection means capable of measuring non-discrete changes in oxygen flow.

Related objects and advantages of the present invention will become more apparent by reference to the following figures and detailed description.

DESCRIPTION OF THE PREFERRED EMBODIMENT

Figure 1:
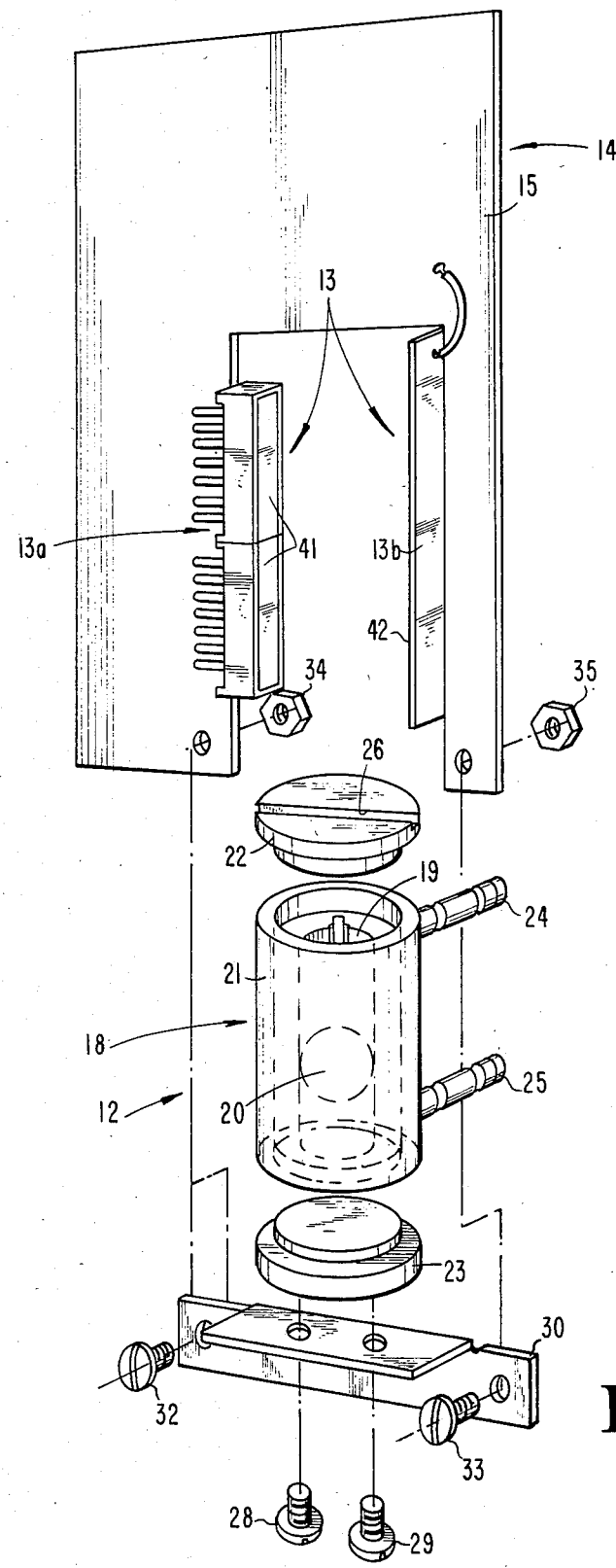
FIG. 1 is an exploded view of the flow meter of the present invention.
Figure 3:
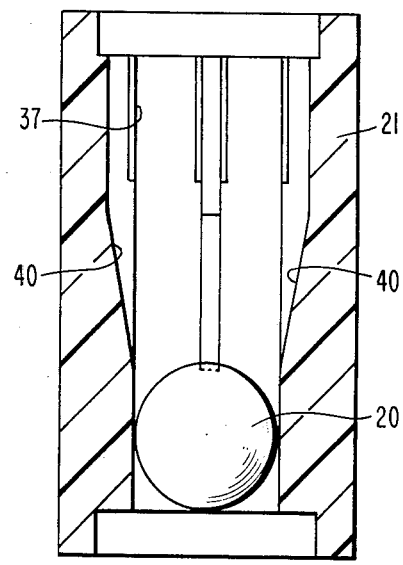
FIG. 3 is a section view taken along lines 3—3 in FIG. 2.
Figure 2:
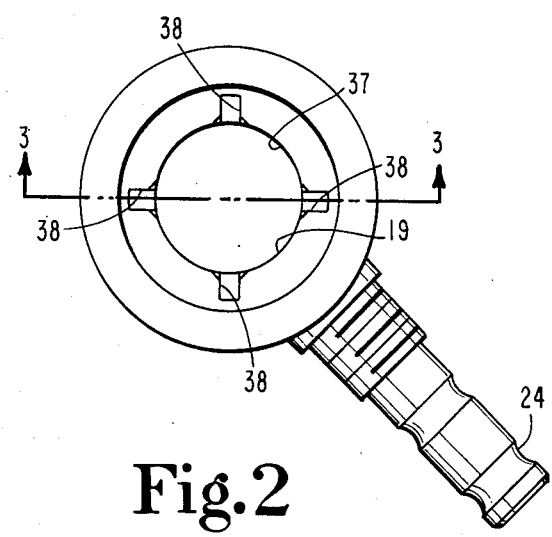
FIG. 2 is a top plan view of the flow meter body with the top cap removed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illusrated device, and such further applications of the principles of the invention as illustrated therein being contemplated as would normally occur to one skilled in the art to which the invention relates.

In the preferred embodiment depicted in the drawings, the apparatus 10 of the present invention meters the volume of oxygen delivered to a patient from an oxygen concentrator (not shown). The apparaus 10 generally comprises a mechanical flow gage 12; a position detection means 13 including a light source 13a and a light sensitive element 13b mounted on opposite sides of the flow gate 12; associated circuitry generally designated at 14 mounted on the reverse side of circuit board 15, as seen in FIG. 1; and a digital display 16 for displaying the accumulative volume of oxygen delivered the concentrator. The flow gage 12, position detection means 13 and associated circuitry 14 on board 15 are encased within a housing 17, while the digital display 16 is mounted on the exterior of housing 17.

Flow gage 12 is comprised of a translucent cylindrical shaped enclosure 18 defining an inner flow chamber 19 within which is received a float indicator 20. Flow gage 12 operates on the basis of Stoke's law, that is, the chamber 19 is formed such that its cross sectional area increases in an upward direction and the flow rate of oxygen through the flow gage is determined by measuring the relative upward displacement of the float indicator 20. The flow gage 12 depicted in the drawings is specifically designed to operate within relatively low flow rates, that is in a range from approximately 0 to 8 liters per minute.

Enclosure 18 is comprised of a body 21 and top and bottom caps 22 and 23 which respectively attach in an airtight sealed manner to the upper and lower ends of body 21 and provide. Fittings 24 and 25 are mounted in body 21 along the upper and lower portions of body 21, and respectively serve as the outlet and inlet passages for flow communication with chamber 19. Top cap 22 has a slot 26 which receives the circuit broad 15 and assures a positive positioning of the flow gage 12 relative to the position detection means 13. The lower end of flow gage 12 is securely fixed to board 15 by a mounting bracket 30 fixedly attached to board 15 by screws 32 and 33 and locknuts 34 and 35. Bottom cap 23 is provided with a pair of threaded mounting holes that align with corresponding holes in bracket 30 and receive screws 28 and 29 so as to secure cap 23 to bracket 30. Body 21 is preferably formed of a close tolerance machined or cast clear acrylic material, while caps 22 and 23 are also preferably a clear acrylic material. Fittings 24 and 125 may be made of a suitable non-corrosive material.

The configuration of flow chamber 19 is defined for the most part by a closely toleranced cylindrical passageway 37 having a diameter which is only slightly larger than the diameter of float indicator 20. Float indicator 20 is a sphere formed of a non-corrosive opaque material in order to cast a definite shadow on the light sensitive element 13b.

Chamber 19 is further defined by four longitudinal slits 38 in body 21 which extend outwardly of the cylindrical passageway 37 and are equally radially spaced apart 90 degrees. The slits 38 extend along approximately the upper two thirds of body 21 and have a rectangular horizontal cross sectional shape along their lengths.

Each of the slits 38 have a wedge shaped tapered portion 40 along the mid-portion of body 21. The tapered portions 40 serve to provide an upward increase in the cross-sectional area of chamber 19, the rate of increase being constant along the length of the portions 40. As a result of the wedge shaped tapered portions 40, the relationship between flow rate and vertical displacement of indicator 20 is linear when the center of the indicator is between the upper and lower ends of the tapered portions 40 of the slits 38. Since the cylindrical portion 37 of chamber 19 has a constant cross sectional area, the upward increase in cross sectional area of chamber 19 is accounted for entirely by the tapered portions 40 of slits 38. This permits much greater flow measurement accuracy because it is much easier to control variations in area within the slits than to achieve similar dimensional control when the cylinder diameter is increased. It this regard, it may be noted that the slits 38 extend along only a relatively small portion of the total circumference of the cylindrical passageway 37 and the maximum cross sectional area of the slits 38 is cumulatively much smaller than the cross sectional area of cylindrical passageway 37. In the embodiment shown in the drawings, slits 38 together subscribe less than one third of the circumference of the cylindrical passageway 37, while the maximum cross sectional area of all of the slits 38 is less than one tenth the cross sectional area of cylindrical passageway 37. It should also be noted that by providing the slits 38, the float indicator 20 is positively maintained in position laterally by the cylindrical wall of passageway 37, thus reducing the tendency of the indicator 20 to wobble and thereby produce a less definite shadow.

Position detection means 13 detects the position of the shadow of indicator 20 cast upon surface 42 and provides a voltage output which is inversely linearly related to the upward displacement of indicator 20 within chamber 19. Position detection means 13 includes a light source 13a means comprising a pair of vertically arranged LED bars 41 and a light sensitive element 13b which is a photopotentiometer. Because the photopotentiometer is sensitive to ambient light which produces non-linearity in the phototentiometer output, housing 17 totally encloses the flow gage 12 and detection means 13.

Photopotentiometer 13b is horizontally aligned with LED bars 41 such that light emitted from LED bars 41 is transmitted through the translucent enclosure 18 and baths the light sensitive surface 42 of photopotentiometer 13b. The resistance across the light sensitive surface 42 of photopotentiometer 13b increases as the shadow cast by indicator 20 moves upwardly along surface 42. Since the input of photopotentiometer 13b is connected across a constant voltage source, photopotentiometer 13b provides an output voltage which, with respect to its applied voltage, is inversely linearly related to the position of the shadow cast by indicator 20 as it moves between LED bars 41 and photopotentiometer 13b. This is accomplished by inverting the applied voltage to photopotentiometer 13b, maintaining the entire sensitive area of photopotentiometer 13b bathed in a well diffused and constant light, and maintaining constant shape of the shadow of indicator 20 throughout its travel. Thus, the bars 41 are positioned sufficiently far enough removed from the indicator 20 to permit a uniform bath of light to encompass the sensitive area of photopotentiometer 13b, while photopotentiometer 13b is positioned as close to indicator 20 as possible to receive the best defined shadow.

It should be apparent that the distance between the light source and flow gage may be varied in order to maximize or minimize certain design considerations such as lamp power dissipation, luminous intensity, lamp life and light intensity degradation over time. In the preferred embodiment, LED bars 41 are spaced approximately $\frac{1}{8}''$ from flow gage 12.

Figure 4:
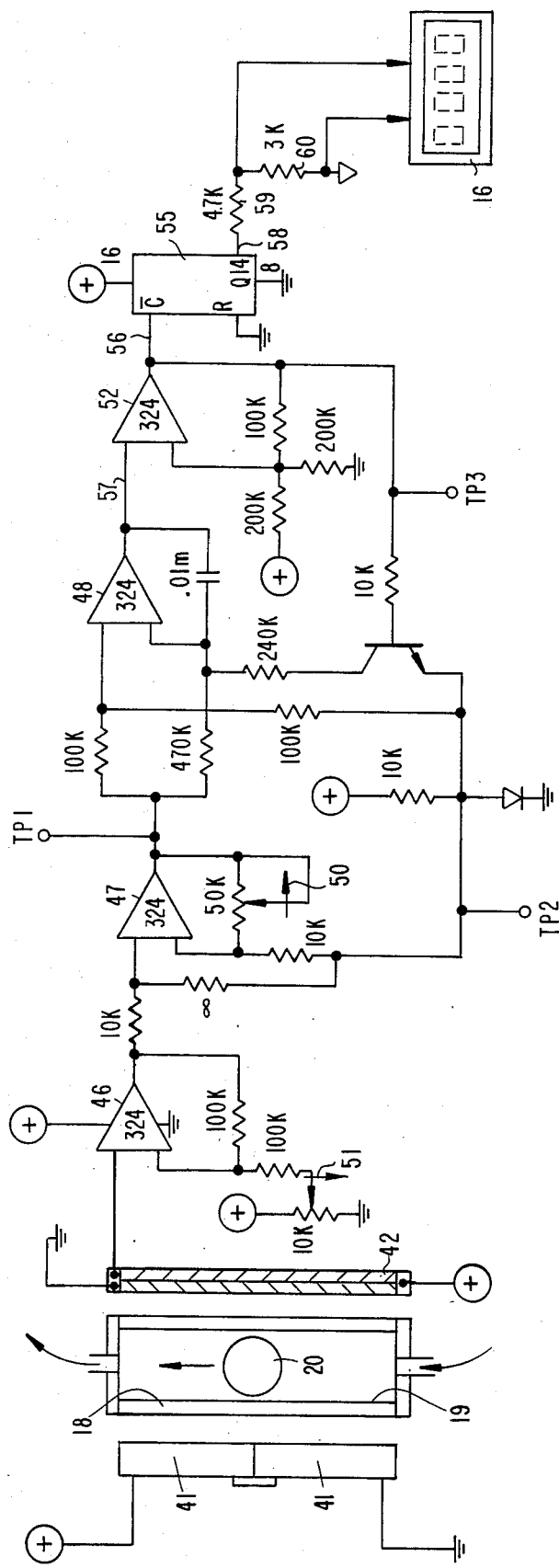
FIG. 4 is a schematic diagram of the electrical circuitry associated with the flow meter of the present invention.
Figure 5:
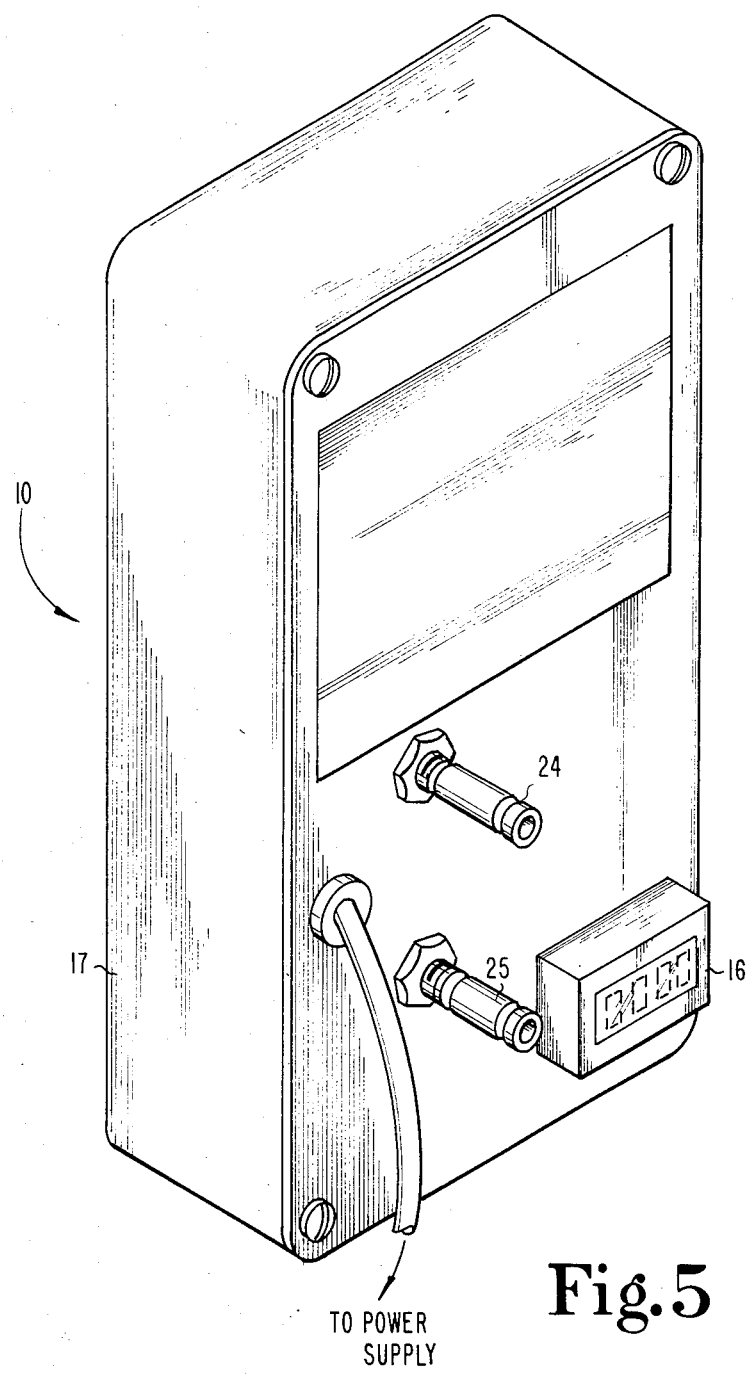
FIG. 5 is a perspective view of the flow meter of the present invention in assembled relation.

Referring now to FIG. 4, the output from photopotentiometer 13b proceeds to a circuitry which converts the analog input voltage into a digital stream of pulses, each pulse scaled to represent 1 cu. ft. of oxygen flowing through flow gage 12. The circuitry includes amplification means provided by staged amplifiers 46–48, calibration means provided by potentiometers 50 and 51, voltage to frequency conversion through voltage controlled oscillator 52, and frequency division through counter 55. While not shown in FIG. 4, it is understood that the various circuit elements depicted are connected to a suitable voltage regulated DC power supply.

Initially, the output from photopotentiometer 13b is sent through amplifiers 46–48 which provide suitable staged amplification of the output voltage from photopotentiometer 13b for input to voltage controlled oscillator 52. High and low cal variable potentiometers 50 and 51 respectively provide a means for calibrating the circuitry for maximum and minimum flow through flow gage 12 to ensure accurate readout.

In the embodiment depicted, the low calibration is set by introducing oxygen flow through flow gage 12 until the center of the indicator 20 is raised to a position in horizontal alignment with the bottom end of the tapered portions 40. Low cal potentiometer 51 is then adjusted until the voltage between TP1 and TP2 is 0 volts. High calibration is accomplished by applying flow through gage 12 which causes the center of indicator 20 to reach the full scale position (8 lpm) corresponding to the top end of the tapered portions 40 and adjusting potentiometer 50 until the frequency of the output signal from oscillator 52, which can be sampled at TP3, reads 769 Hz (13 ms. period).

Voltage controlled oscillator 52 receives the amplified analog output from amplifier 48 and delivers a stream of digital pulses on line 56 having a frequency which is directly related to the input voltage on line 57. When properly calibrated, 577 output pulses from oscillator 52 represent 1 liter of oxygen flowing through flow gage 12.

The output from oscillator 52 is connected to the clock input line of digital counter 55, which is a Motorola MC14020 16 pin binary up counter. Digital counter 55 serves as a frequency divider, counting the pulses received from oscillator 52 and providing an output pulse scaled to represent 1 cu. ft of oxygen flowing through flow gage 12. In the disclosed embodiment, the output line 58 from counter 55 is tied to the Q14 output which effectively divides the clock input frequency by a factor of 16,384. The output pulse stream on line 58 is sent, after scaling down the voltage through resistors 59 and 60, to a conventional digital display 16 having a binary coded decimal up counter. Display 16 thus provides a visual readout of the accumulative oxygen flow through flow gage 12.

It may be appreciated that the apparatus described above provides a means for accurately monitoring the accumulative flow of oxygen from a device, such as an oxygen concentrator, at relatively low flow rates and pressures ranging from 1 to 10 p.s.i. and 0.5–10 liters/min. The apparatus 10 provides electronic monitoring means which is non-invasive relative to the oxygen flow, thus avoiding any hazard from associating an electrical current in proximity to high concentrations of oxygen. The position detection means is capable of monitoring continuous as opposed to discrete changes in the position of the float indicator by providing a linear infinite step analog representation of flow rate. Therefore, significantly more accurate readings are provided.

It should be apparent that while the preferred embodiment described above is used to meter the volume of oxygen delivered to a patient from an oxygen concentrator, the invention may also be used to meter other substantially clear gases or liquids for other purposes.

It should also be apparent that certain modifications to the disclosed embodiment could be made to increase its sophistication and accuracy, if desired. For example, in addition to monitoring acumulative flow, circuitry providing continuous analog or digital display of flow rate information could be easily added. Also, accumulative flow could be displayed more accurately by employing a lower scaling factor in counter 55. Thus, the output pulse from counter 55 could represent 0.1 cu.ft. as opposed to 1 cu.ft. of oxygen.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for metering the volume of flow of a fluid, comprising:
    a mechanical flow gage including,
    (a) a housing having upper and lower portions and defining an inner flow chamber, the upper and lower portions of said housing respectively having output and input flow passages in flow communication with said chamber, said chamber including a cylindrical passageway having a first diameter and being further defined by a plurality of longitudinal slits in said housing, said slits extending outwardly of said cylindrical passageway and radially spaced apart, each of said slits having along at least a portion of their lengths a taper extending outwardly towards the upper portion of said housing such that the cross-sectional area of said chamber increases upwardly along the length of said tapered portions of said slits, and
    (b) a spherically shaped float indicator received within said chamber and having a diameter slightly smaller than the cylinder diameter of said chamber, whereby, when the center of said indicator is positioned along the tapered portion of said slits, the flow rate of said fluid flowing through said chamber is directly linearly related to the upward displacement of said indicator;
    a position detection means, associated with said flow gage but non-invasive with respect thereto, for detecting the positon of said indicator and providing an analog output which is responsive to the position of said indicator, said position detection means including a light emitting means and a light sensitive element oppositely positioned relative to said flow meter, said light sensitive element having a working surface facing said light emitting means which varies in electrical resistance in relationship to light cast upon its surface, said working surfaces aligned with said cylindrical passageway and said light emitting means, said light emitting means bathing said light sensitive element in a beam of light having a constant intensity throughout said working surface except when said float indicator is in a position which interferes with the passage of light between said light emitting means and said light sensitive element, wherein the resistance across said light sensitive element varies linearly with the vertical displacement of said float indicator along the length of said tapered portions of said slits; and
    an analog to digital conversion means for converting the analog output from said position detection means into a digital output representative of the accumulative volume of fluid flow through said mechanical flow gage.

2. The apparatus of claim 1 wherein said analog to digital conversion means includes a voltage to frequency converter, a digital counter for counting with reference to the output of said voltage to frequency converter and a digital display for displaying a digital representation of the accumulative volume of flow through said flow meter.

3. The apparatus of claim 2 wherein said voltage to frequency converter includes an oscillator coupled to the output of said position detection means and producing an AC output having a frequency which is directly linearly related to the output voltage from said position detection means, said digital counter for counting with reference to said oscillator.

4. The apparatus of claim 3 and further comprising: an amplification means for amplifying the output from said position detection means for input to said voltage to frequency converter.

5. The apparatus of claim 1 wherein said slits extend along less than half the circumference of said cylindrical passageway.

6. The apparatus of claim 5 wherein the maximum cross sectional area of said slits is cumulatively less than the cross sectional area of said cylindrical passageway.

7. The apparatus of claim 1 wherein said tapered portions of said slits are defined by a wedge shaped projection extending within each of said slits.

8. The apparatus of claim 7 wherein said slits are equally radially spaced about said chamber.

9. The apparatus of claim 1 wherein said light sensitive element of said position detection means is a photopotentiometer.

* * * * *